(12) United States Patent
Fujita et al.

(10) Patent No.: US 7,793,093 B2
(45) Date of Patent: Sep. 7, 2010

(54) COMMUNICATIONS STATE TRANSITION MONITORING METHOD AND COMMUNICATIONS STATE TRANSITION MONITORING DEVICE UTILIZING THE SAME

(75) Inventors: Naoyuki Fujita, Tokyo (JP); Tsuyoshi Ishii, Tokyo (JP)

(73) Assignee: Japan Aerospace Exploration Agency, Tokyo (JP)

( * ) Notice: Subject to any disclaimer, the term of this patent is extended or adjusted under 35 U.S.C. 154(b) by 1268 days.

(21) Appl. No.: 11/334,562

(22) Filed: Jan. 19, 2006

(65) Prior Publication Data

US 2006/0190592 A1 Aug. 24, 2006

(30) Foreign Application Priority Data

Jan. 31, 2005 (JP) .............................. 2005-024502

(51) Int. Cl.
*H04L 29/06* (2006.01)
(52) U.S. Cl. ...................................... 713/151; 709/224
(58) Field of Classification Search .................. 726/22, 726/23; 709/224; 705/51, 54; 713/189, 713/194; 717/168
See application file for complete search history.

(56) References Cited

U.S. PATENT DOCUMENTS

| 6,263,444 | B1 * | 7/2001 | Fujita ........................... 726/25 |
| 6,851,061 | B1 * | 2/2005 | Holland et al. ................. 726/23 |
| 7,185,368 | B2 * | 2/2007 | Copeland, III ............... 726/25 |
| 2004/0034795 | A1 * | 2/2004 | Anderson et al. ........... 713/201 |

FOREIGN PATENT DOCUMENTS

JP 2003-050752 A 2/2003

OTHER PUBLICATIONS

"The Common Intrusion Detection Framework Architecture" Phil Porras, et al.
Internet Security Systems, RealSecure Network Sensor Policy Guide, Version, 7.0.
CERT Advisory CA-2001-26 Nimda Worm.
"Probabilistic Alert Correlation", Alfonso Valdes and Keith Skinner.
Internet Security Systems, RealSecure Network Sensor and Gigabit Network Sensor Installation Guide, Version 7.0.

* cited by examiner

*Primary Examiner*—Pramila Parthasarathy
(74) *Attorney, Agent, or Firm*—Westerman, Hattori, Daniels & Adrian, LLP

(57) ABSTRACT

It is an object of the present invention to provide a device for generating analysis object data that allows the simple setting of an intrusion detection policy, and more specifically, to allow policy setting that performs pattern matching with a plurality of signatures summarized as a single intrusion detection policy, and to allow policy setting that performs pattern matching of the context of an attack and response to this attack.

12 Claims, 7 Drawing Sheets

PROCESSING COMBINING A PLURALITY OF COMMUNICATIONS

CONFIGURATION OF DATA COLLECTION FUNCTION

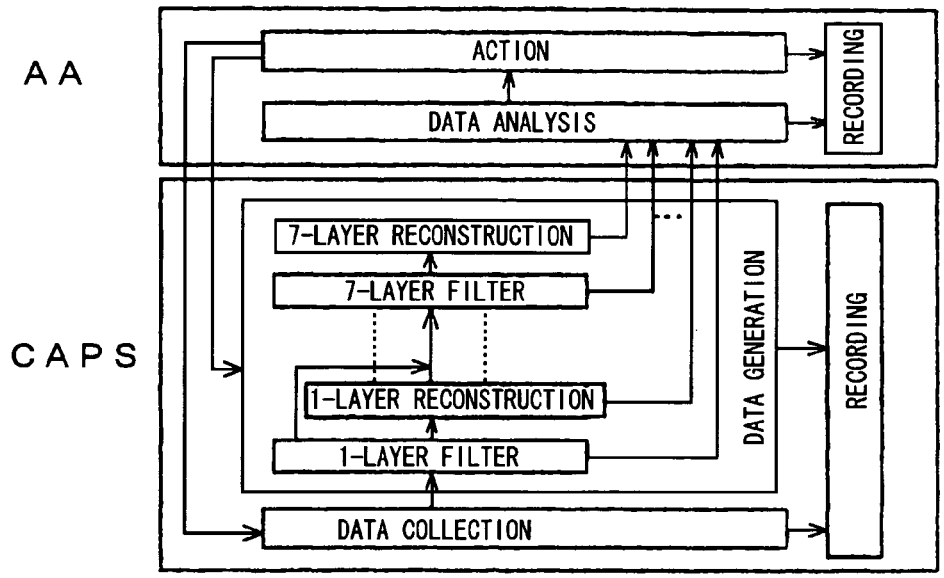
Fig. 4   CA CONSTITUENT ELEMENTS AND ASSOCIATION OF THESE ELEMENTS
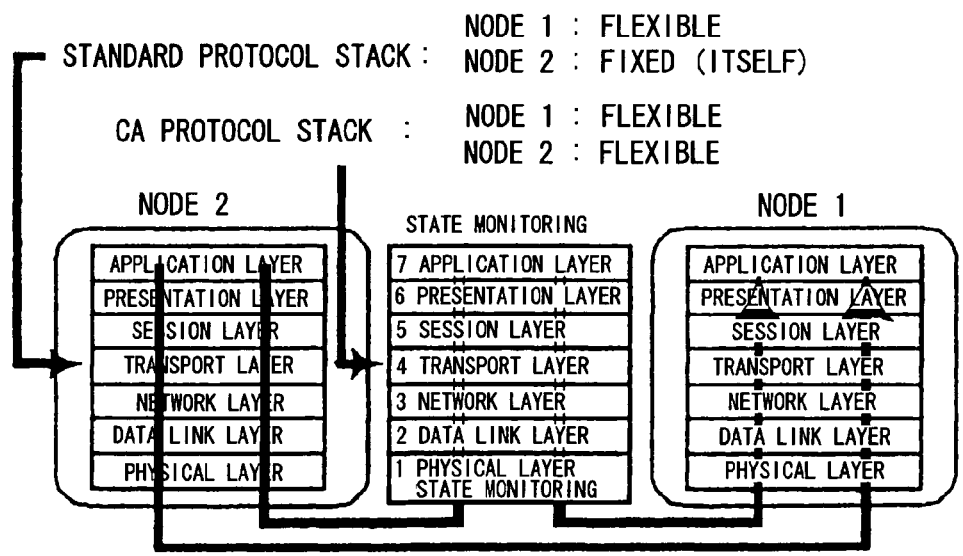
Fig. 5   CA PROTOCOL STACK

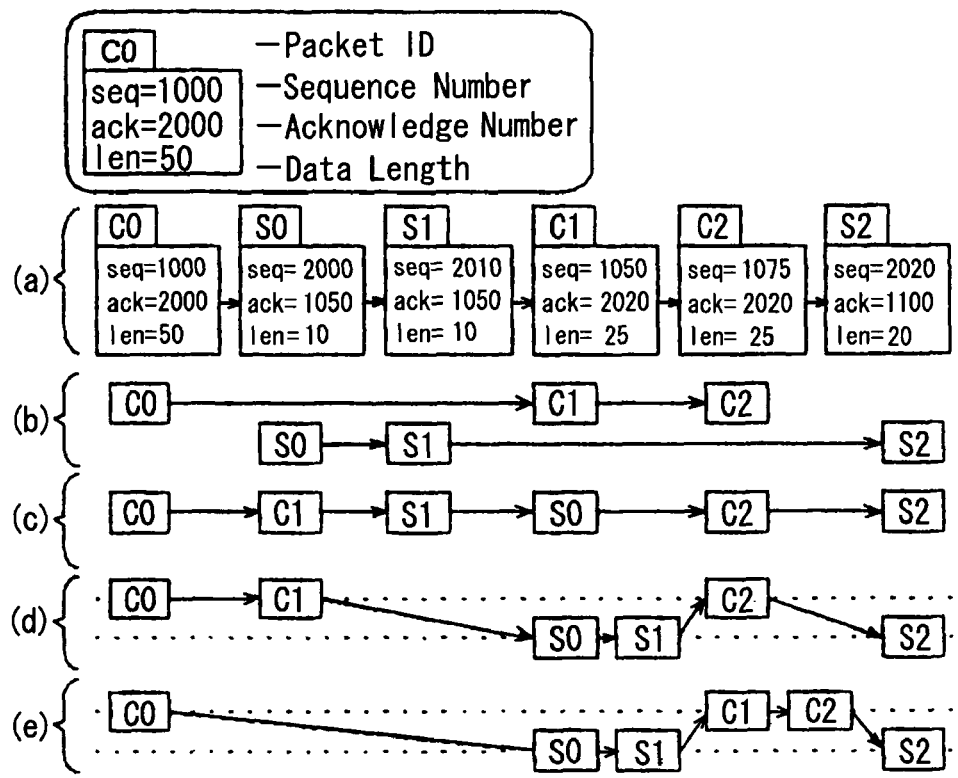
Fig. 6    RECONSTRUCTION PROCESSING
Fig. 7    PACKET A
(1)
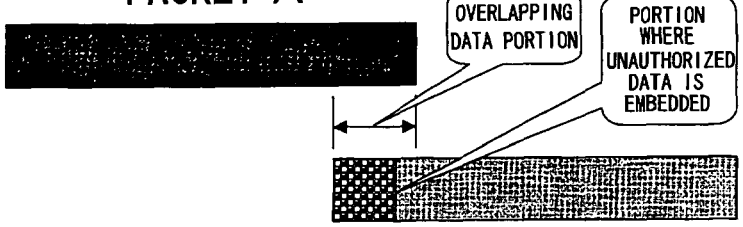
PACKET B
(2) WHEN RECONSTRUCTION IS PERFORMED USING PACKET A ... IT APPEARS AS THOUGH UNAUTHORIZED DATA HAS NOT BEEN SENT; FURTHERMORE, UNAUTHORIZED BEHAVIOR DOES NOT OCCUR.
(3) WHEN RECONSTRUCTION IS PERFORMED USING PACKET B, UNAUTHORIZED DATA IS BECOMES SENSIBLE, AND UNAUTHORIZED BEHAVIOR OCCURS.

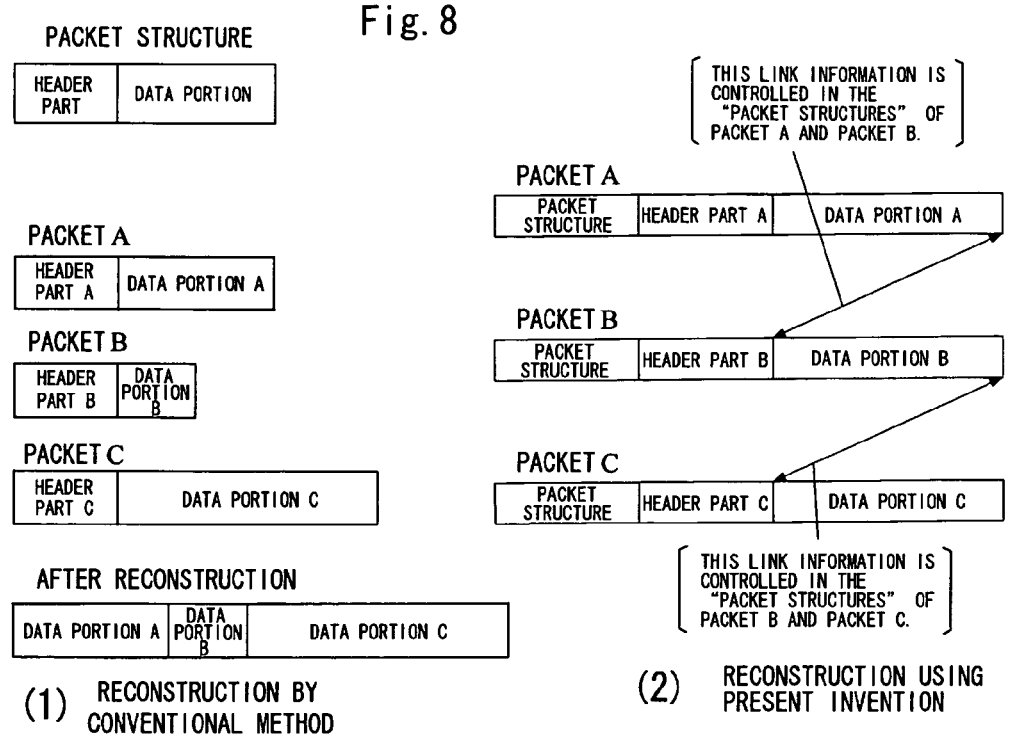
Fig. 8
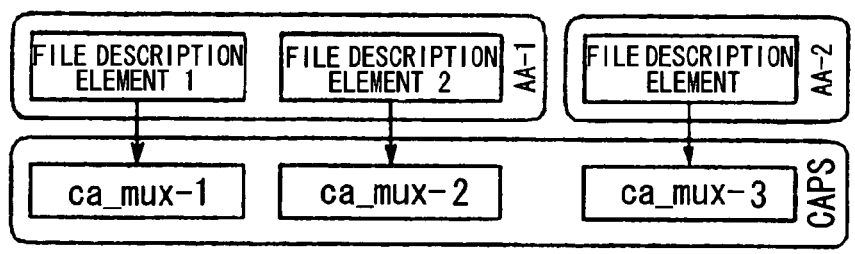
Fig. 9  RELATIONSHIP OF ca_mux AND AA

Fig. 10

EXAMPLE OF INTRUSION DETECTION POLICY OF CA

```
<host name="victim">                                                  (01)
    <ipreassmode>REASS_IP_Solaris</ipreassmode>                       (02)
    <tcpreassmode> REASS_TCP_Solaris </tcpreassmode>                  (03)
    <addr>192.168.0.3</addr>                                          (04)
</host>                                                               (05)

<action name="log_and_syslog">                                        (06)
    <log format="log1">nimda_log.txt</log>                            (07)
    <syslog format="sysl" facility="auth" level="info"/>              (08)
</action>                                                             (09)

<rulegroup name=nimda_detect_rule">                                   (10)
    <wait>                                                            (11)
        <reass/>                                                      (12)
        <exp>protocol.type.s2d==PROTO_CMD_SENT</exp>                  (13)
        <expgroup attr="or">                                          (14)
            <exp>protocol.data.s2d=="GET /scripts/root.exe?/c+dir"</exp>  (15)
            <exp>protocol.data.s2d=="GET /MSADC/root.exe?/c+dir"</exp>    (16)
        </expgroup>                                                   (17)
    </wait>                                                           (18)
    <wait timeout=1000">                                              (19)
        <reass/>                                                      (20)
        <exp>protocol.type.d2s==PROOTO_CMD_SENT</exp>                 (21)
        <exp>protocol.data.d2s=="200 OK"</exp>                        (22)
    </wait>                                                           (23)
</rulegroup>                                                          (24)

<analyzer name="nimda_detector" type="session">                       (25)
    <remotehost>any</remotehost>                                      (26)
    <refhost ref="victim">                                            (27)
    <port proto="tcp">139,80</port>                                   (28)
    <module>parser1</module>                                          (29)
    <refrulegroup ref="nimda_detect_rule"/>                           (30)
    <refaction ref="log_and_syslog"/>                                 (31)
</analyzer>                                                           (32)
```

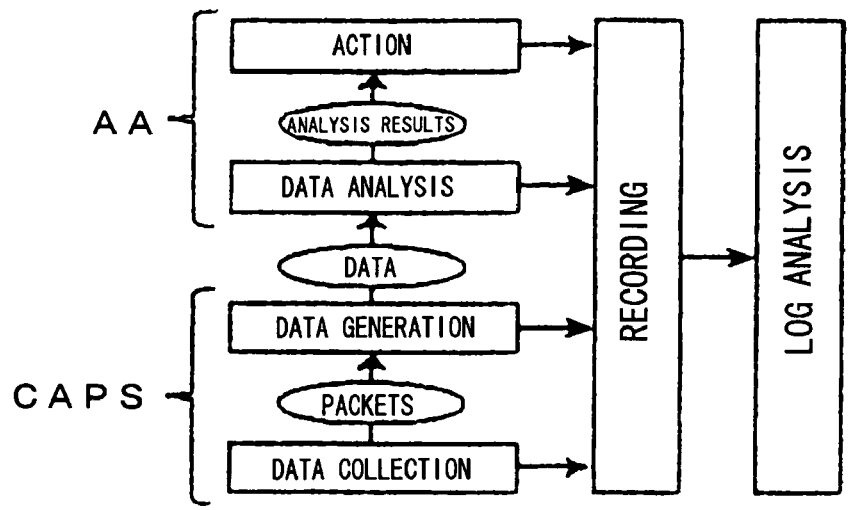
Fig. 11    CONSTRUCTION AND FUNCTION OF IDS, AND RELATIONSHIP OF THE TWO
Fig. 13
EXAMPLE OF HIERARCHICAL PROTOCOL
(7-LAYER MODEL OF ISO)
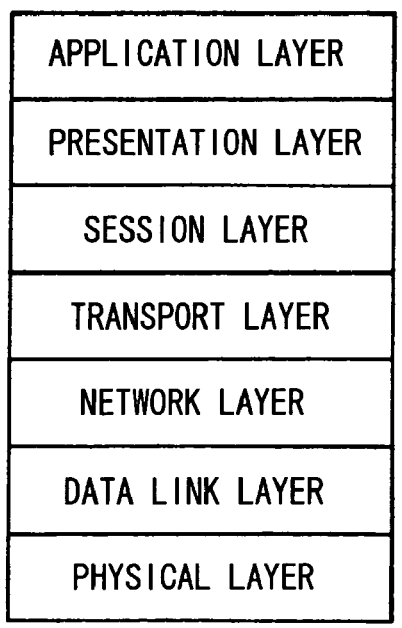

```
alert tcp $EXTERNAL_NET any -> $HOME_NET 139 (msg:"NETBIOS nimda .eml"; flowto_server,established; content:"|00|.|00|E|00|M|00|L";
referenceurl,www.f-secure.com/v-descs/ni
mda.shtml; classtypebad-unknown; sid1293; rev10;)

alert tcp $EXTERNAL_NET any -> $HOME_NET 139 (msg:"NETBIOS nimda .nws"; flowto_server,established; content:"|00|.|00|N|00|W|00|S";
referenceurl,www.f-secure.com/v-descs/ni
mda.shtml; classtypebad-unknown; sid1294; rev10;)

alert tcp $EXTERNAL_NET any -> $HOME_NET 139 (msg:"NETBIOS: nimda RICHED20.DLL"; flowto_server,established;
content:"R|00|I|00|C|00|H|00|E|00|D|00|2|00|0"; referenceurl,www
.f-secure.com/v-descs/nimda.shtml; classtypebad-unknown; sid1295; rev9;)
```

Fig. 12  EXAMPLE OF DETECTION SIGNATURE OF "Nimda" WORM IN Snort

COMMUNICATIONS STATE TRANSITION MONITORING METHOD AND COMMUNICATIONS STATE TRANSITION MONITORING DEVICE UTILIZING THE SAME

BACKGROUND OF THE INVENTION

1. Field of the Invention

The present invention relates to a communications state transition monitoring method for detecting unauthorized access in communications systems that utilize a network, and a communications state transition monitoring device that utilizes this method, and further relates to a communications state transition monitoring program and a computer-readable recording medium on which this program is recorded.

2. Description of the Related Art

Recognition that the ensuring of security during the utilization of the internet is an important task has already has already penetrated into society in general. Even in cases where there is no physical harm, the leakage or destruction of information may cause great damage to society or organizations. At the current time, with the internet becoming generally used as a means of connecting computers, maximum precautions need to be taken with regard to the transmission of information or management of information via the internet. Currently, along with firewalls, intrusion detection systems (hereafter referred to as "IDS") are utilized as a means of improving safety.

Such an IDS is a system which checks in order to ascertain whether there is any intrusion or advance signs of intrusion by checking the status of computer files and packets that flow through networks. There are also systems which have the function of cutting off the communications involved in cases where intrusion is detected in some area. Such systems are also distinguished by the use of the name IPS, IDP or the like; in the present specification, however, systems with such a protective function will be included in the category of IDS. In existing IDS, erroneous detection and the production of extremely large amounts of log data in which behavior that is not intrusive behavior is erroneously recognized as intrusive behavior may occur. This is a serious problem in the utilization of IDS. In order to improve the precision of detection of such intrusion, a log analysis function has been added to IDS; however, the problem of the production of extremely large amounts of log data is found in the background of such a function. The present inventor believes that the cause of such production of extremely large amounts of log data is to be found in the difficulty of setting intrusion detection policies. In other words, since it is difficult to describe policies by constricting the types of events that are to be detected, the description of policies becomes partial/fragmented; as a result, it appears that the role of extracting the events that were originally to be detected is relegated to the log analysis function.

It is a basic object of the present invention to provide an IDS system in which the policy descriptiveness is improved so that events that are to be detected can be accurately described in terms of policy, thus preventing an increase in the detection flow so that the log output amount can be reduced, and the precision with which intrusion is detected can be heightened. Currently, the setting of intrusion detection policy is generally accomplished by a skilled person (hereafter called a "network specialist") experienced in packet analysis with knowledge of the fourth level of TCP or IP OSI (hereafter referred to as a "lower level") or lower, utilizing a policy that is distributed by the software vendor or the like, or using his own description. In this method, however, only some specialists such as network specialists or the like perform policy setting and monitoring, so that it is difficult to expand the stratum of persons utilizing such IDS as a security tool. Furthermore, it would appear that the set content of such policy could be made more precise, i.e., that unauthorized behavior that is to be detected could be defined more accurately, by performing not only monitoring at lower levels, but also monitoring of command utilization at the fifth level of OSI or higher (hereafter referred to as "higher levels"); however, network specialists do not always have a thorough knowledge of application command systems or correct utilization methods of such systems. On the other hand, there are also persons who have a deep capacity for the analysis of higher levels such as various applications or the like, even though these persons may have little knowledge of lower levels (such persons will hereafter be referred to as "persons experienced in applications"). If persons experienced in applications can described intrusion detection policies, more accurate policy description becomes possible at higher levels. In other words, in order to heighten the precision of intrusion detection, it is necessary to describe the policy as a whole accurately from lower levels to higher levels. In order to accomplish this, it would appear that a structure that allows a division of policy description work in which network specialists are responsible for the description of policies at lower levels while persons experienced in applications are responsible for the description of policies at higher levels is required in IDS.

Before the current state of existing systems is discussed, the functions that constitute an IDS will be defined. A reference model, i.e., Common Intrusion Detection Framework (CIDF), is proposed in the reference "Internet Security Systems. Real Secure Network Sensor Policy Guide Version 7.0, http://www.isskk.co.jp/manual/RS_NetSensor_PG_7.0j_pdf, 2002". This reference model proposes event generators, event analyzers, response units and event databases as IDS constituent functions. In the present specification, the subject will be discussed using a model [a] in which the portion comprising these event generator functions is divided into data collection and data generation functions, and [b] which is constructed from the following six functions with the log analysis function added: data collection function (data collection), data generation function (data generation), data analysis function (data analysis), action function (action), recording function (record) and log analysis function (log analysis) (see FIG. 11). Below, furthermore, in order to simplify the description, the unauthorized access processing system (cracking analyzer) will be called the "CA", the data collection function and data generation function in this CA will be referred to collectively as the "CAPS" (cracking analysis protocol stack), and the data analysis function and action function will be referred to collectively as the "AA" (application analyzer).

The development of IDS has been performed positively, whether as a commercial product or freeware; "RealSecure Network Sensor", "Dragon Host Sensor", "Cisco IDS", "Snort", "Tripwire" and the like have been developed. The former three systems are commercial products, while the latter two systems are freeware. The present applicant et al. have also proposed a network irregularity analysis method which is a method for analyzing irregularities in a network constructed so that communications are performed according to a hierarchical protocol among information communications stations, comprising a data collection step in which packets transmitted on the abovementioned network are taken in, a data generation step in which the parameters of hierarchical modules corresponding to a hierarchical protocol are set on the basis of information designated by a configuration file that has been read in beforehand, and analysis data is generated by filtering the packets from the abovementioned data collection step using the abovementioned respective hierarchical modules, and reconstructing the finely divided data of the of the abovementioned packets up to a hierarchy level that is set beforehand, and a data analysis step in which a judgment is made as to whether or not an irregularity has occurred in the analysis data from the above-mentioned data generation step on the basis of the content designated by the configuration file that has been read in beforehand (laid open by the Japanese Patent Office on Nov. 24, 1998 as publication of Japanese Patent Application No. 10-313341 "Network Irregularity Analysis Method, Network Irregularity Analysis Device Utilizing This Method, and Computer-Readable Recording Medium on Which a Network Irregularity Analysis Program is Recorded".

Existing systems can be effectively utilized in existing places with existing materials; however, several problems have been point out in practical use. If these indicates problems are set in order, problems that are to be solved in IDS may be summarized as follows:

(1) The setting of intrusion detection policies is difficult. (2) The corresponding OS are limited. (3) Performance is inadequate. (4) Signal communications cannot be analyzed. (5) The cost of introduction is high. (6) Existing application boundaries must be altered.

SUMMARY OF THE INVENTION

It is an object of the present invention to provide a combination for generating analysis object data that allows the simple setting of intrusion detection policy in order to solve the abovementioned problem of the "difficulty of setting intrusion detection policy" that is often pointed out among the abovementioned problems that are to be solved in IDS. This can be said to be an improvement in the data generation function in the functions of IDS shown in FIG. 11.

Here, first of all, the current conditions regarding the setting of intrusion detection policy will be summarized in order to clarify the object of the present invention. The notorious "Nimda" worm will be treated as an example of the object of detection. The "Nimda" worm acts as a worm using numerous ports such as TCP25, TCP80, TCP139, TCP445 and the like. Here, we will consider the detection of a host that is attacked by the "Nimda" worm. The detection signature of the well-known IDS Snort is shown in FIG. 12. In this signature, the worm activity using No. TCP139 will be described. The port indicated above is a port that is used in an extremely standard manner; accordingly, if connection activity involving this port is merely detected on an individual basis, then (for example) regular Windows (registered trademark) network communications activity is also erroneously detected as worm activity. In order to detect worm activity, it is necessary to confirm that the numerous ports mentioned above are being utilized in association with each other. Systems that summarize a plurality of associated signatures into a single signature and provide this summarization to the user [Real Secure Network Sensor], as well as methods utilizing a tool that analyzes the association of logs in which individual detection results are output and the like, are being studied as methods for solving the abovementioned problems. However, since signatures provided by software vendors and the like are general descriptions, modification is unavoidable in the case of actual application to individual sites. For example, network specialists may alter host information embedded in the signature on an individual basis throughout the policy as a whole in order to obtain agreement with actual conditions at individual sites, and in cases where communications patterns of applications contained in the policy are generated even under conditions of regular utilization, network specialists may need to delete or modify signatures containing these patterns on the advice of persons experienced in applications. In other words, modifications are made in order to prevent erroneous detection; as before, however, the conditions that cause a high capacity to be required for policy setting are not modified.

Furthermore, there are also problems in the case of detection of individual signatures. For example, let us consider a case in which (for example) "GET/scripts/root.exe?/c+dire", which is a character sequence that is characteristic of "Nimda" worm activity, is detected. The worm activity is successful in cases where this character sequence appears as an http GET command, and this command succeeds. In cases where this character sequence appears in a context that has no meaning as a command, or the command does not succeed, no actual damage occurs, but this is recorded in the log. Opinion as to whether this log accumulation should be viewed as useful log or erroneous detection varies according to the object of monitoring. If it is desired to grasp what is happening on a day to day basis on the network that is being managed, then a log of attempted attacks is useful. On the other hand, if it is desired to detect only successful attacks, then this is viewed as erroneous detection. From the standpoint of network security, the detection of attempted attacks is one of the important functions involved. On the other hand, in the occurrence of incidents that press for a rapid response, and IDS log that specifies and records hosts that have actually been damaged by attacks is useful in work that is performed in order to prevent the spread of damage. A system using a context filter [Real Secure Network Sensor] is available as a method in which the system is arranged so that patterns in a context that have no meaning as a command are not detected. However, what this system guarantees is only that the object of pattern matching is limited to http GET commands; the occurrence of intrusive behavior including the success of such GET commands is not detected.

From the above, the objects of intrusion detection policy setting may be summarized as the following two points.

(Object 1) To allow the simple association setting of a plurality of signatures, i.e., to allow pattern-matching policy setting by summarizing a plurality of the signatures as one intrusion detection policy.

(Object 2) To allow context setting by the pairing of attacks and responses, i.e., to allow policy setting that achieves pattern matching of the context of attacks and corresponding responses.

Specifically, it is an object of the present invention to provide a device for generating analysis object data that allows the simple setting of intrusion detection policies, and more concretely, to devise the system so that pattern-matching policy setting can be accomplished by summarizing a plurality of signatures as a single intrusion detection policy, and to devise the system so that the setting of policies that perform pattern matching of the contexts of attacks and corresponding responses is possible.

The present invention proposes the following two methods for achieving the two objects described above.

Specifically, a function that acquires data from a plurality of streams is proposed as means of achieving object 1 described above. This can be realized as a function based on the approach that the difficulty of pattern setting can be ameliorated if it is possible to analyze a plurality of communications from a single standpoint. In the case of the famous IDS software SNORT, for example, it is judged that detection has taken place in cases where a packet that is matched by at least one of a plurality of signatures is observed. However, for example, the first of the plurality of signatures is to be detected if a specified character sequence is transmitted to the TCP139 port, but there are also communications other than the worm of interest in which this character sequence is transmitted, so that it is premature to consider that this worm has been detected on the basis of this signature alone; accordingly, it is necessary analyze any log that is output on the basis of these signatures. In other words, the abovementioned content cannot be accurately described as the intrinsic signature of the worm in question. In the case of this worm, there is an action that sends the worm software utilizing not only the TCP139 port but also the TCP80 port. Accordingly, if the signature description can be set so that communications that transmit the abovementioned specified character sequence using both the TCP139 and TCP80 ports are detected, the probability that the communications that are detected as a result will constitute the worm in question is increased. Consequently, the unauthorized access detection system of the present invention makes it possible to devise the system so that analysis data from a plurality of streams can be acquired as shown in model form in FIG. 1, and to set the policy so that (for example) cases in which communications of a signature 1 using SMB and communications of a signature 2 using http are observed between a specified source (information source) and destination (transmission destination) are observed are taken as detection of the abovementioned worm.

In the unauthorized access processing system (CA) of the present invention, this function is realized by means of a dual structuralization, i.e., (1) a completely separate structuralization of a communications processing functional unit (CAPS) with a data collection function and data generation function based on a CA socket library, and an analysis functional unit (AA) with a data analysis function and an action function, and (2) a completely modular structuralization according to an ISO 7-level model (see FIG. 13) of the CAPS.

The former structuralization relates to the modulization of the CA as a whole. In cases where the analysis of a plurality of sets of communications from a single viewpoint is considered, the levels of the ISO 7-level model constituted by the plurality of sets of communications, and the types of communications that are to be summarized and analyzed, differ for each object of analysis. Accordingly, since the levels and number of objects of analysis are not limited, a structure which sends requests for the necessary analysis data from the analysis function side to the communications processing function is required. A structure in which the analysis function (AA) is completely separated from the signal processing function (CAPS) has been used in order to realize this. Accordingly, regardless of the type of data requested by the analysis function, the generation of alterations in the software that realizes the communications processing function. Furthermore, on the basis of the concept that "the basic software of an unauthorized access processing system such as an IDS is a protocol stack, and should be distinguished from applied software that performs analysis or the like", a model is indicated in which the basis software functional unit (CAPS) and the applied software functional unit (AA) are clearly distinguished, and these two functional units are connected by a CA socket library.

The latter structuralization relates to the modulization of the CAPS. The CAPS has a structure in which the respective levels according to the ISO 7-level model are independent; respective filter modules and reconstruction modules are disposed within the modules of the respective levels, and the respective levels have interfaces that transfer data to the AA. As a result of this CAPS structure, the AA can simultaneously monitor a plurality of communications paths.

In the present invention, a stream pair forming function is proposed as means for achieving the abovementioned object 2. The object of pattern matching in an IDS is usually packet units. In addition, the use of data following IP fragment re-connection processing or TCP stream reconstruction processing as objects of pattern matching (see publication of Japanese Patent Application No. 10-313341) is also possible. In addition, the CA of the present invention also realizes a stream pair formation function as shown in model form in FIG. 2. Below, in order to make a clear distinction between the concepts of source and destination in packets, and the two principal communicating entities in unicast communications, the two principal communicating entities will be called the client and server. However, this does not cause any loss of generality in the discussion here. In unicast communications, the exchange of data is performed between the above-mentioned client and server; the communications in this case consist of two types of communications, i.e., communications from the client to the server (hereafter referred to as "client communications") and communications from the server to the client (hereafter referred to as "server communications"). In this case, in the existing IDS indicated in "Internet Security Systems. Real Secure Network Sensor Policy Guide Version 7.0, http://www.isskk.co.jp/manual/RS_NetSensor_PG_7.0j_pdf, 2002" and "Snort", no association is maintained between such client communications and server communications, and the respective types of communications are treated as unassociated communications. However, in order to allow the AA to grasp the context of "attacks and responses to these attacks" in Object 2, it is necessary that the CAPS maintain the association of these two types of communications, and transmit this association to the AA. As a result of this context being understood, intrusion detection including the success or failure of attacks of the worm in question becomes possible.

The communications state transition monitoring method of the present invention is devised so that the method confirms that the communications are continuous communications as stream pairs using both the sequence numbers and acknowledgment numbers of the hierarchical communications content, and so that data is transferred to the higher levels; accordingly, the method has a function that acquires analysis data from stream pairs such as commands and responses, and intrusion detection with a high probability is possible. Furthermore, using both the sequence numbers and acknowledgment numbers of the hierarchical communications content, the method can not only reconstruct stream pairs in one dimension, but can also appropriately perform reconstructions of respective one-way communications only.

The communications state transition monitoring system of the present invention is devised so that in a system in which a functional unit AA that analyzes the hierarchical content of communications and a communications processing functional unit CAPS corresponding to analysis results are completely separated, requests for necessary analysis data are sent from the AA to the CAPS in accordance with the object of analysis by the designation of parameters; accordingly, the reconstruction algorithm can be varied without limiting the levels or number of the objects of analysis.

The communications state transition monitoring method of the present invention is devised so that packet structures into which initial and final connection information for the respective data portions in the packet information is written are added to the respective packets with header parts attached; accordingly, both reconstructed data and packet headers can be simultaneously evaluated.

The communications state transition monitoring system of the present invention has a function that simultaneously evaluates packet units and session units with a single set of analysis data as the object; accordingly, various analyses can be performed for cleverly devised unauthorized access attempts, and diverse responses can be made for individual terminals in accordance with the states of these terminals.

To summarize, the CA of the present invention is a system that achieves the object of heightening the intrusion detection precision in an IDS. As a result of providing an environment that allows the description of contextual settings by the simple association setting of a plurality of signatures and the pairing of attacks and responses, the present invention makes it possible to broaden the levels of utilization of security tools, so that persons with a deep analytical capacity for higher levels can participate directly in unauthorized access processing; as a result, overall policies from lower levels to higher levels can be accurately described, and the quantity of IDS log data output can be reduced without increasing the instances of unauthorized access that escape detection.

BRIEF DESCRIPTION OF THE DRAWINGS

FIG. 4 is a diagram showing the basic construction of the CA of the present invention;

FIG. 5 is a diagram showing the operating position of the protocol stack of the CA of the present invention;

FIG. 6 is a diagram illustrating reconstruction processing in the present invention;

FIG. 7 is a diagram illustrating the processing of unauthorized data embedded in the packet information;

FIG. 8 is a diagram illustrating the processing of the CA of the present invention;

FIG. 9 is a diagram illustrating an embodiment in which stream pairs are managed as summarized objects of analysis;

FIG. 10 is an example of description of the intrusion detection policy of the CA of the present invention;

FIG. 11 is a diagram showing the association of construction and function in the IDS;

FIG. 12 is an example of description of the worm detection signature according to Snort; and FIG. 13 is a diagram showing an example of a hierarchical protocol.

DESCRIPTION OF THE PREFERRED EMBODIMENTS

The essential constituent elements of the CA of the present invention and the functions of these elements will be described here. First, the two elements that are the main constituent elements of the CA, and that constitute the CAPS that realizes a solution to the abovementioned problems, i.e., the data collection function and the data generation function, will be described.

Figure 1:
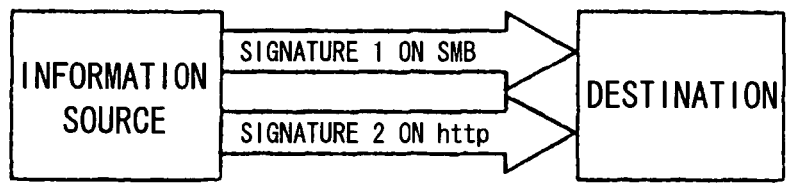
FIG. 1 is a diagram illustrating the concept of the comprehensive processing of a plurality of sets of communications.
Figure 2:
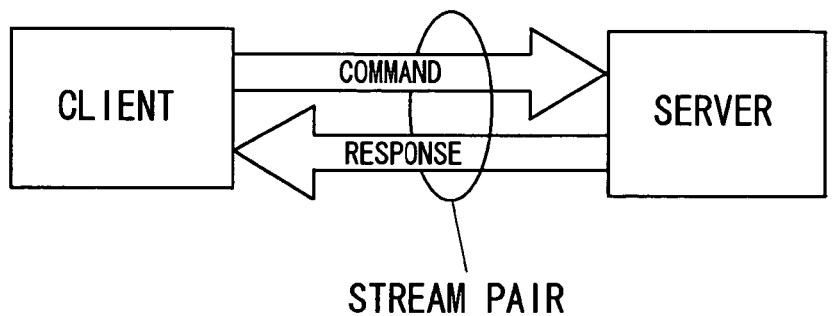
FIG. 2 is a diagram illustrating stream pairs in the present invention.
Figure 3:
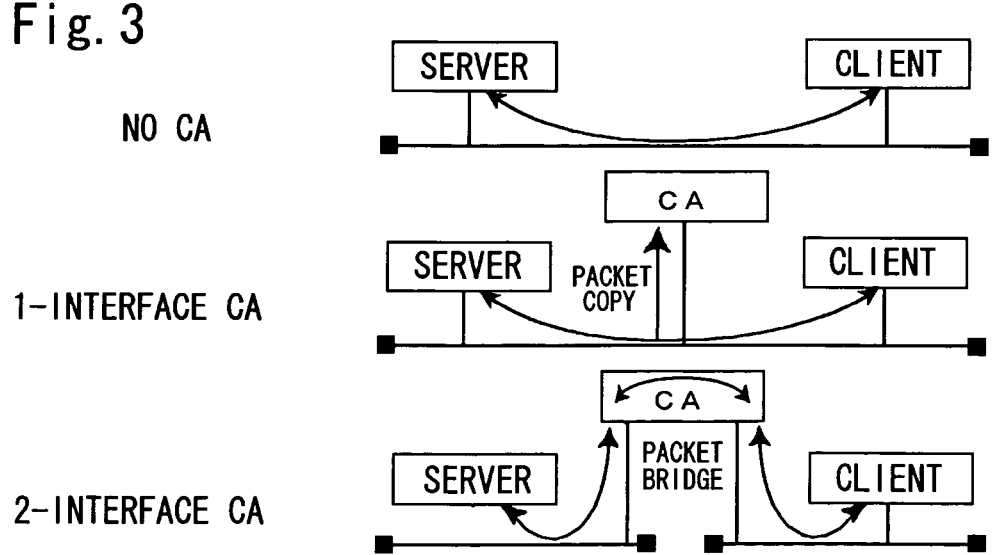
FIG. 3 is a diagram showing a configuration of the data collection function in schematic terms.

In regard to the data collection module of the CA of the present invention, there are cases in which there is a single network interface, and cases in which there are two network interfaces. In cases where there are two network interfaces, packet bridging can be performed, so that the session hijacking function can be made effective. In cases where there is a single network interface, session monitoring, session cutting and the like can be performed; however, this is also possible in the case of two network interfaces. FIG. 3 shows a configuration used in cases where client-server communications are monitored by a CA.

Next, the data generation module of the CA of the present invention will be described; FIG. 4 shows the constituent elements of the CA and a diagram of the relationships of the same. The analysis data acquisition function for acquiring analysis data from a plurality of streams is located in the data generation module ("data generation" in the figure). A structure is use in which the interior of the data generation module is formed with a complete layer structure, and data is directly transferred to the data analysis module from all of the layers. The respective layers of the hierarchical protocol are constructed from a filter module (Layer n Filter) and a reconstruction module (Layer n Reassemble). The construction of this data generation unit (as indicated in the abovementioned publication of Japanese Patent Application No. 10-313341) is as follows: namely, a function is added whereby the CAPS in the present invention receives not only a designation of the packets that are taken in, but also (from the AA) a designation of the data required by the AA, including the manner in which the reconstruction processing of the packets that are taken in is to be performed; the operation of the filter modules and reconstruction modules of the respective layers is determined on the basis of this data designation, and the data format required by the AA can be created.

In such reconstruction modules, there is a problem peculiar to CAs that is not found in ordinary IDSs. This is the problem of the formation of session pairs indicated below. In a CA, reconstruction processing in connection directional protocol processing such as TCP or the like is essential; this can be realized by not setting the condition of a communications end point in the ordinary TCP processing algorithm. FIG. 5 shows the operating position of the protocol stack of the CA. An ordinary socket library is designed with communications between the node operated by this library (node 2) and another node (node 1) as a prerequisite. However, the library of a CA is designed with communications between nodes not operated by the library (node 1 and node 2) as a prerequisite, so that the participation of the system's own host in communications is not necessarily a condition. As is seen from FIG. 5, the protocol stack of a CA is designed so as to fulfill a function similar to that of a network device such as a router, switch or the like. As a result, a protocol stack is obtained which can handle arbitrary communications.

Next, the reconstruction processing of the CA will be considered. It is assumed that packets are exchanged between the client and server in a temporal order such as that shown in FIG. 6 (a). Here, by realizing ordinary TCP reconstruction processing in which a "C number" in the packet ID indicates a client communications packet, and an "S number" indicates a server communications packet, it is possible to reproduce client communications and server communications accurately as shown respectively in FIG. 6 (b), even if a disturbance is generated in the packet arrival order, or duplicate packets are generated as a result of resending requests or the like. In this case, sequence numbers (seq) and data lengths (len) are used in reconstruction. The reconstruction processing in the CA will be considered here. In regard to the order of packet arrival in the CA as well, the order may be interchanged as in the case of the client and server. For example, let us assume that packets arrive in the order C0, C1, S1, S0, C2, S2 as shown in FIG. 6 (c). Here, in cases where ordinary TCP reconstruction processing is performed, the packets that are transmitted from the CAPS to the AA are in the order shown in FIG. 6 (d). The upper rank comprises client communications, and the lower rank comprises server communications. If (d) and (b) are compared here, it is seen that the packets are transferred to the AA in the correct order in both cases if only client communications and server communications are noted. In the case of (d), however, C1 is transferred to the AA at an earlier time. Judging from the context, as is shown in FIG. 6 (a), C1 must be transferred to the AA after S1. In the CA of the present invention, this problem is solved by means of a delayed reconstruction algorithm. To summarize, this is an algorithm in which "data is transferred to higher layers while confirming that the communications are continuous communications as stream pairs using both sequence numbers and acknowledgment numbers".

The manner in which the transfer of C1 to the upper layers is delayed by the delayed reconstruction algorithm will be described with reference to FIG. 6, Table 1 and Table 2.

TABLE 1

Client Communications

| Packet ID | Sequence Cseq | Data Len. # Clen | Sequence # after sent Cseq-after = Cseq + Clen | Acknowledge # Cack |
|---|---|---|---|---|
| (Initial) | 1000 | — | — | 2000 |
| C0 | 1000 | 50 | 1050 | 2000 |
| C1 | 1050 | 25 | 1075 | 2020 |
| C2 | 1075 | 25 | 1100 | 2020 |

TABLE 2

Server Communications

| Packet ID | Sequence # Sseq | Data Len. Slen | Sequence # after sent Sseq-after = Sseq + Slen | Acknowledge # Sack |
|---|---|---|---|---|
| (Initial) | 2000 | — | — | 1000 |
| S0 | 2000 | 10 | 2010 | 1050 |
| S1 | 2010 | 10 | 2020 | 1100 |
| S2 | 2020 | 20 | 2040 | 1100 |

Table 1 and Table 2 show the arrangement of the sequence number and acknowledgment numbers of the packets rearranged by ordinary TCP reconstruction processing for the respective client communications and server communications in FIG. 6 (c) showing the arrival order. In regard to the packet ID C0 and C1, Table 1 shows that the sequence numbers are continuous as client communications, and FIG. 6 (c) shows that the packets arrive continuously, so that continuous transfer to the higher levels is possible. Ordinary TCP reconstruction operates in this manner (continuous transmission of C0 and C1 in the upper rank of FIG. 6 (d)). In cases where this is viewed from the higher levels, data from the lower levels is transferred as though C0 and C1 have a continuous context. In actuality, however, since the communications of S0 and S1 in the opposite direction from C0 are also present, so that in the CA of the present invention, the transmission timing of the data is determined by the delayed reconstruction algorithm so that S0 and S1 are sent out before C1 is sent out. When C1 is to be sent out, the acknowledgment number 2000 of C0 (which has already been sent out) and the acknowledgment number 2020 of C1 are compared. Here, in cases where the two numbers are different, communications in the opposite direction are generated between the two packets in an amount equal to the gap; accordingly, the transmission of C1 is delayed until these communications are sent out to a higher layer. Here, these communications in the opposite direction are S0 and S1 in Table 2. After S0 and S1 are sent out, since the sequence number of the server communications is 2020, the client communications acknowledgment number (that is a condition for sending out C1) and the server communications sequence number (underlined part in Tables 1 and 2) coincide, so that C1 can be sent out (C1 in upper rank of FIG. 6 (e)). Confirmation that is exactly the same as that of the above-mentioned example is also performed when packets of server communications sycg as SO, S1 or the like are sent out.

The reason that this is called delayed reconstruction is as follows: namely, since the system "waits until the acknowledgment number of the packet that is to be transferred to a higher layer and the sequence number of the communications oriented in the opposite direction are the same", the transfer of data to a higher layer may be delayed. By recognizing this delay, it is possible to supply data that maintains a correct correspondence between client communications and server communications to higher layers even if a disturbance occurs in the order of arrival of the packets. This function cannot only arrange the transferred packet information as time sequence information in the information source, but can also be expanded to arrangement in a time sequence according to the requests.

The flexibility of the processing method of the present invention in cases where there are overlapping data portions between "packets that have arrived" and "newly arriving packets" during packet reconstruction will now be described in concrete terms.

The overlapping of data in packet information is a threat to security under the conditions described below. For example, the following conditions (see (1) in FIG. 7) are considered.

It is assumed that:

(a) packet A (packet that has arrived) arrives first, and that packet B (newly arriving packet) arrives afterward, (b) overlapping data portions are present between the two packets, and (c) unauthorized data is embedded in one of these overlapping data portions (in the packet arriving later in the case of this example).

Ordinarily, in the case of overlapping data portions, data reconstruction is performed using the overlapping portion from either the packet that has arrived or the newly arriving packet. For example, in cases where the packet A that has arrived is used, reconstruction results such as those shown in FIG. 7 (2) are obtained, while in cases where the newly arriving packet B is used, reconstruction results such as those shown in FIG. 7 (3) are obtained. In cases where the contents of the overlapping data portions are the same, the reconstruction results of (2) and (3) are the same; however, when the abovementioned condition of (c) is present, the reconstruction results of (2) and (3) are different.

Here, assuming that unauthorized data is embedded in one of the overlapping data portions, unauthorized behavior may occur or not occur depending on the manner of reconstruction. Parties attempting to perform unauthorized behavior utilize this operation. In other words, when a check is made for unauthorized behavior, the data is reconstructed as normal data as in (2), and at the time of arrival at the actual node, the data is divided among a plurality of packets, and transmitted with packets having overlapping portions as the object of attack, so that unauthorized behavior occurs as in (3). The reason that this is possible is that in cases where there are overlapping data portions, the use of either the data of the arrived packet A or the data of the newly arriving packet B cannot be set according to the host that is the object of attack at the time that a check is made for unauthorized behavior. In the CA of the present invention, this attack can be detected as a result of this reconstruction algorithm being made variable.

There are also various manners of overlapping of the overlapping data portions of the arrived packet A and newly arriving packet B, as is shown for example below; the present invention makes it possible to adopt counter processing for each of these configurations.

Example 1: cases in which the rear portion of the arrived packet and the front portion of the newly arriving packet are overlapped.

Example 2: cases in which the front portion of the arrived packet and the rear portion of the newly arriving packet are overlapped.

Example 3: cases which are such that when the newly arriving packet is enveloped by the arrived packet, the beginning and end of the newly arriving packet do not match those of the arrived packet.

Example 4: cases which are such that when the arrived packet is enveloped by the newly arriving packet, the beginning and end of the arrived packet do not match those of the newly arriving packet.

Example 5: cases which are such that when the arrived packet is enveloped by the newly arriving packet, only the beginning of the arrived packet matches that of the newly arriving packet.

Example 6: cases which are such that when the newly arriving packet is enveloped by the arrived packet, only the beginning of the newly arriving packet matches that of the arrived packet.

Example 7: cases which are such that when the arrived packet is enveloped by the newly arriving packet, only the end of the arrived packet matches that of the newly arriving packet.

Example 8: cases which are such that when the newly arriving packet is enveloped by the arrived packet, only the end of the newly arriving packet matches that of the arrived packet.

Example 9: cases in which the arrived packet and newly arriving packet match each other.

In these configurations as well, the present invention makes it possible to detect unauthorized data embedded in either of the packets.

When packet data consisting of a header part and data portion is reconstructed by a conventional method, information of consecutive data portions is connected so that no data of the header parts remains. Accordingly, the technique of the present invention relating to a reconstruction processing method that does not lose the packet headers will be described next.

A case in which packets A, B and C are reconstructed in that order is shown in FIG. 8 (1) as an example of a conventional method. As is shown in the figure, only data portions are present among the information contained in the packets A, B and C following reconstruction; the information of the header parts is deleted as a result of reconstruction. In this state, data analysis extending over the data portions A, B and C following reconstruction is possible; however, analysis of the header parts is impossible.

FIG. 8 (2) illustrates the technique of the present invention. The three data portions are not directly connected; instead, entities known as packet structures are added to the three packets, and these packet structures are devised so as to express reconstruction information such as (for example) "the end of data portion A is connected to the beginning of data portion B" and "the end of data portion B is connected to the beginning of data portion C". As a result, data analysis extending over the data portions A, B and C following reconstruction (which is made possible by the method described above with reference to FIG. 8), and analysis that also includes the header parts of the packet units, are simultaneously possible.

Embodiment 1

An embodiment in which a module known as ca_mux is provided in the data generation module of the CA of the present invention will be described, although this is not shown in FIG. 4. mux indicates multiplexing, and provides a function that controls associated stream pairs as summarized objects of analysis, and maintains an interface with the AA. In this embodiment, one ca_mux is assigned in correspondence with one file description element acquired by the AA. Furthermore, as is shown in FIG. 9, one AA can hold a plurality of ca_mux. In other words, one AA can analyze a plurality of streams, or a plurality of protocol layers within a single stream. An ordinary socket library transmits and receives only the data of a specified stream; however, the library of the CA of the present invention has a structure that can simultaneously transmit and receive the data of a stream pair. The reason that this is possible is that ordinary socket library interfaces are grouped, and operate in the manner of a meta-socket library.

Thus, since one AA can hold a plurality of ca_mux, pattern matching can be performed with a plurality of signatures (object 1) being summarized as a single intrusion detection policy; furthermore, the pairing of attacks and responses (object 2) can be realized by controlling the stream pairs by means of ca_mux.

Embodiment 2

In the packaging of the CAPS platform provided in the CA of the present invention, a program structure is used in which code that depends on the operating system and on whether or not the space in which unauthorized access processing is executed is a kernel space or user space (this operating system and execution space will hereafter be referred to collectively as the environment), and code that does not depend on the environment, are clearly separated. Packaging was set in the following five environments:

(1) Windows (registered trademark) kernel space (2) NetBSD kernel space (3) Linux kernel space (4) Solaris kernel space (5) Linux user space For reference, Table 3 shows the proportions of environment-dependent code and environment-independent code in the respective types of packaging. The numbers of lines also count the number of lines of source code including the comment parts of the program.

TABLE 3

| | Coding Amounts | | |
|---|---|---|---|
| Implement Env. | Env. Independent part [line] A | Env. Dependent part [line] B | $\frac{B}{A+B} \times 100$ [%] |
| Windows Kernel | 20371 | 4405 | 18 |
| NetBSD Kernel | | 2364 | 10 |
| Linux Kernel | | 2962 | 13 |
| Solaris Kernel | | 2983 | 13 |
| Linux UserProcess | | 5443 | 21 |

In regard to the communications between the CAPS and AA, the communications between this CAPS and AA differ according to the space in which the CAPS and AA are packaged. Here, therefore, examples of embodiments are shown for the communications interface in Table 4. The actual communications program performs system core packaging or socket communications packaging in environment-dependent code.

TABLE 4

Communications Interface of CAPS and AA

| No. | CAPS Implement space | AA Implement space | Comm. Interface |
|---|---|---|---|
| 1 | Kernel | User | System Call |
| 2 | User | User | Socket Interface |
| 3 | Kernel or User | Separated host from CAPS | Socket Interface |

In regard to the two objects mentioned above, an evaluation is performed on the basis of examples of description of the intrusion detection policy of the CA of the present invention. The CA of the present invention operates using the intrusion detection policy shown for example in FIG. 10. The contents described in FIG. 10 will be briefly described below. (01) through (05) are definitions of host information; these indicate the IP address (04), IP packet defragmentation algorithm (02) and TCP reconstruction algorithm (03). (06) through (09) are definitions of action functions; these indicate writing into the log file (07) and writing into the syslog (08) along with file names and parameters. (10) through (24) are definitions of the intrusion detection policy. (11) and (18) are designations of loop ranges; these are omitted when evaluations within the loops are true. Within the loops, communications read-in designations up to the delimiter (12), the question of whether or not the read-in data was a command transmission from source to destination (arrival destination) (13) and the like are checked. The loops surrounded by (14) and (17) indicate that these loops are omitted if even one of the evaluation equations contained holds true. (15) and (16) are parts of the signature of the "Nimda" worm; in the actual description, these parts account for the major portion of the description as a whole. The lines surrounded by (19) and (23) are checks of the responses to (15) or (16), (25) through (32) are definitions of data analysis functions, and are described using the contents up to (24) and the like.

First, in regard to the simple association setting of a plurality of signatures corresponding to object 1, the parts of (14) through (17) define the policy of "detect if even one of the signatures surrounded by (14) and (17) is generated" by the "attr="or"" of (14); it is seen that a plurality of signatures are defined as one policy, so that pattern matching can be accomplished. In regard to the specialization of signature description, if it is considered that (14) through (17), which are the set parts of the signatures, do not contain any set contents requiring knowledge of the lower layers, it may be said that this has been achieved. Signature descriptions requiring a knowledge of lower layers are summarized in (02) through (04) and (26) through (28). What is important here is that signature settings requiring a knowledge of lower layers and signature settings requiring a knowledge of higher layers can be performed separately. A single policy can be created with network specialists taking responsibility for settings requiring a knowledge of lower layers, and application specialists taking responsibility for settings requiring a knowledge of higher layers. If this is compared to existing signatures of the type shown in FIG. 12, in which the description of a single signature is difficult without a knowledge of all the layers from lower layers to higher layers, it would appear that this contributes to an improvement in signature description. Furthermore, in FIG. 12, information concerning the host that is the object of monitoring must be respectively described at the heads of a plurality of signatures, so that the same description must be given three times in the policy as a whole. In FIG. 10, on the other hand, a single definition in (04), (26) and (27) is sufficient.

Next, in regard to context setting by the pairing of attacks and responses relating to object 2, (11) through (18) are the attacks, and (19) through (23) are settings that perform pattern matching of the responses to these attacks. It is seen that the distinction between server communications and client communications can be set by (13) and (21) with the time sequence relationship of attacks and responses in the descriptive order of setting. In a conventional method, (15), (16) and (22) are individually recorded as intrusion detection signatures, and respective logs are output; furthermore, there is a need for processing such as estimation of the time sequence relationship, searching for logs consisting of pairs from the numerous attack logs and response logs and the like using a log analysis function on these logs while utilizing added information such as time stamps or the like. In the method of the present invention, on the other hand, such processing is completed at the time of detection, and in the logs as well, the series of events comprising attacks and responses are summarized and output only once. Thus, since the association of a plurality of signatures and the relationships of individual application commands and responses can be described within the signatures, the quantity of logs output from the IDS can be reduced without increasing the number of missed detections, so that the IDS can manifest an effect with regard to rapid responses at the time that incidents occur, such as specification of the host that has been attacked or the like.

Furthermore, in regard to the quality of intrusion detection, when FIG. 12 showing the conventional device and FIG. 10 showing the CA of the present invention are compared, it is seen that in the case of FIG. 12, it is merely detected that several specified patterns have been transmitted to the server, while in the case of FIG. 10, patterns extending over a plurality of protocols can be detected including the success or failure of transmission of worm software. As a result, this method can describe a higher degree of detection contents.

What is claimed is:

1. A communications state transition monitoring method in a system for estimating communications state transitions in which a functional unit application analyzer (AA) that analyzes a hierarchical content of communications and a communications processing functional unit cracking analysis protocol stack (CAPS) corresponding to analysis results are completely separated, the communications state transition monitoring method comprising a step of sending requests for necessary data regarding the strata and number of the objects of analysis to said CAPS from said AA, to simultaneously monitor as a stream pair a plurality of communications paths from a single viewpoint, wherein the requests for said necessary data are requests for analysis data that is necessary in accordance with the objects of analysis as designated by the parameters, and the use of either the data of the arrived packet A or the data of the newly arriving packet B can be set according to the host that is the object of attack at the time that a check is made for unauthorized behavior in cases where there are overlapping data portions by making it possible to vary a reconstruction algorithm without limiting the strata and number of the objects of analysis.

2. A communications state transition monitoring method in a system for estimating communications state transitions in which a functional unit application analyzer (AA) that analyzes a hierarchical content of communications and a communications processing functional unit cracking analysis protocol stack (CAPS) corresponding to analysis results are completely separated, the communications state transition monitoring method comprising a step of sending requests for necessary data regarding the strata and number of the objects of analysis to said CAPS from said AA, to simultaneously monitor as a stream pair a plurality of communications paths from a single viewpoint, wherein the CAPS can appropriately reconstruct stream pairs one-dimensionally/in respective one-way communications only in accordance with the requests for said necessary data, using both the sequence numbers and acknowledgment numbers of the hierarchical communications content.

3. The communications state transition monitoring method according to claim 2, wherein continuous communications as stream pairs are confirmed using both the sequence numbers and acknowledgment numbers, and packet information is arranged in a time sequence according to the requests by transferring data to higher strata.

4. A communications state transition monitoring method in a system for estimating communications state transitions in which a functional unit application analyzer (AA) that analyzes a hierarchical content of communications and a communications processing functional unit cracking analysis protocol stack (CAPS) corresponding to analysis results are completely separated, the communications state transition monitoring method comprising a step of sending requests for necessary data regarding the strata and number of the objects of analysis to said CAPS from said AA, to simultaneously monitor as a stream pair a plurality of communications paths from a single viewpoint, wherein both reconstructed data and packet headers can be simultaneously evaluated by adding packet structures into which initial and final connection information of the respective data portions in the packet information is written to the respective packets with header parts attached.

5. A communications state transition monitoring device constituting a system for estimating communications state transitions in which a functional unit application analyzer (AA) that analyzes a hierarchical content of communications and a communications processing functional unit cracking analysis protocol stack (CAPS) corresponding to analysis results are completely separated, the communications state transition monitoring device comprising means for sending requests for necessary data regarding the strata and number of the objects of analysis to said CAPS from said AA, wherein a plurality of communications paths are simultaneously monitored as a stream pair from a single viewpoint, wherein the means for sending requests for said necessary data is means for sending requests for analysis data that is necessary in accordance with the objects of analysis as designated by the parameters, and said means is offered in said CAPS and the use of either the data of the arrived packet A or the data of the newly arriving packet B can be set according to the host that is the object of attack at the time that a check is made for unauthorized behavior in cases where there are overlapping data portions by making it possible to vary a reconstruction algorithm without limiting the strata and number of the objects of analysis.

6. A communications state transition monitoring device constituting a system for estimating communications state transitions in which a functional unit application analyzer (AA) that analyzes a hierarchical content of communications and a communications processing functional unit cracking analysis protocol stack (CAPS) corresponding to analysis results are completely separated, the communications state transition monitoring device comprising means for sending requests for necessary data regarding the strata and number of the objects of analysis to said CAPS from said AA, wherein a plurality of communications paths are simultaneously monitored as a stream pair from a single viewpoint, wherein the CAPS is provided with means capable of appropriately reconstructing stream pairs one-dimensionally/in respective one-way communications only in accordance with the requests for said necessary data, using both the sequence numbers and acknowledgment numbers of the hierarchical communications content.

7. The communications state transition monitoring device according to claim 6, further comprising means for confirming continuous communications as stream pairs using both the sequence numbers and acknowledgment numbers of packet information, and a delayed reconstruction functional unit for transferring data to higher strata together with said confirmation information, wherein the transfer is performed so that the packet information is arranged in a time sequence in accordance with the request.

8. A communications state transition monitoring device constituting a system for estimating communications state transitions in which a functional unit application analyzer (AA) that analyzes a hierarchical content of communications and a communications processing functional unit cracking analysis protocol stack (CAPS) corresponding to analysis results are completely separated, the communications state transition monitoring device comprising means for sending requests for necessary data regarding the strata and number of the objects of analysis to said CAPS from said AA, wherein a plurality of communications paths are simultaneously monitored as a stream pair from a single viewpoint, comprising means for writing initial and final connection information of the respective data portions in the packet information into packet structures, and means for adding said packet structures to the respective packets with header parts attached, whereby said device has a function of simultaneously evaluating both the reconstructed data and the packet headers.

9. A computer-readable recording medium on which a program is recorded, which is used in a system for monitoring state transitions of communications in a format in which a functional unit application analyzer (AA) that analyzes a hierarchical content of communications and a communications processing functional unit cracking analysis protocol stack (CAPS) corresponding to analysis results are completely separated, wherein requests for necessary data regarding the strata and number of the objects of analysis are sent to said CAPS from said AA, and a plurality of communications paths are simultaneously monitored as a stream pair from a single viewpoint, on which a program is recorded wherein the request program for said necessary data performs requests as designated by the parameters for analysis data that is necessary in accordance with the objects of analysis, and the use of either the data of the arrived packet A or the data of the newly arriving packet B can be set according to the host that is the object of attack at the time that a check is made for unauthorized behavior in cases where there are overlapping data portions by making it possible to vary a reconstruction algorithm without limiting the strata or number of the objects of analysis.

10. A computer-readable recording medium on which a program is recorded, which is used in a system for monitoring state transitions of communications in a format in which a functional unit application analyzer (AA) that analyzes a hierarchical content of communications and a communications processing functional unit cracking analysis protocol stack (CAPS) corresponding to analysis results are completely separated, wherein requests for necessary data regarding the strata and number of the objects of analysis are sent to said CAPS from said AA, and a plurality of communications paths are simultaneously monitored as a stream pair from a single viewpoint, on which a program is recorded wherein stream pairs can be appropriately reconstructed in the CAPS one-dimensionally/in respective one-way communications only in accordance with the requests for said necessary data, using both the sequence numbers and acknowledgment numbers of the hierarchical communications content.

11. The computer-readable recording medium according to claim 10, on which a program is recorded wherein continuous communications as stream pairs are confirmed using both the sequence numbers and acknowledgment numbers, and packet information is arranged in a time sequence according to the requests by transferring data to higher strata.

12. A computer-readable recording medium on which a program is recorded, which is used in a system for monitoring state transitions of communications in a format in which a functional unit application analyzer (AA) that analyzes a hierarchical content of communications and a communications processing functional unit cracking analysis protocol stack (CAPS) corresponding to analysis results are completely separated, wherein requests for necessary data regarding the strata and number of the objects of analysis are sent to said CAPS from said AA, and a plurality of communications paths are simultaneously monitored as a stream pair from a single viewpoint, on which a program is recorded wherein initial and final connection information of the respective data portions in the packet information is written into packet structures, and the packet structures are added to the respective packets with header parts attached, whereby both reconstructed data and packet headers can be simultaneously evaluated.

\* \* \* \* \*